United States Patent
Fisher et al.

(10) Patent No.: US 7,899,808 B2
(45) Date of Patent: Mar. 1, 2011

(54) TEXT ENHANCEMENT MECHANISM

(75) Inventors: Roberto Warren Fisher, Los Angeles, CA (US); Chris Kalaboukis, Los Gatos, CA (US); Ronald Martinez, San Francisco, CA (US); Lucas Gonze, Venice, CA (US); Ian C. Rogers, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 374 days.

(21) Appl. No.: 11/925,186

(22) Filed: Oct. 26, 2007

(65) Prior Publication Data

US 2009/0112874 A1    Apr. 30, 2009

(51) Int. Cl.
*G06F 17/30* (2006.01)
(52) U.S. Cl. .................... 707/712; 707/104.1
(58) Field of Classification Search ........... 707/104.1, 707/712, 912, 999.1, 999.107; 709/203; 715/201, 210, 744
See application file for complete search history.

(56) References Cited

U.S. PATENT DOCUMENTS

| | | | |
|---|---|---|---|
| 2002/0078093 A1 | 6/2002 | Samaniego et al. | |
| 2003/0233349 A1 | 12/2003 | Stern et al. | |
| 2004/0030681 A1 | 2/2004 | Shannon et al. | |
| 2008/0222199 A1* | 9/2008 | Tiu et al. .................. | 707/104.1 |

OTHER PUBLICATIONS

Notification of Transmittal of the International Search Report and the Written Opinion of the International Searching Authority, or the Declaration, PCT Rule 44.1, International Application No. PCT/US2008/081140, May 29, 2009, 12 pages, Mailed May 29, 2009.

* cited by examiner

*Primary Examiner* — Fred I Ehichioya

(57) ABSTRACT

Media enhancing services for pages containing text is described. Text is analyzed to determine related additional media available on the network, and the page description is augmented with metadata to identify the additional media in an enhanced page description. When the enhanced page is rendered, the metadata facilitates incorporation of additional media in the displayed page.

18 Claims, 7 Drawing Sheets

```
<script language = "JavaScript" type= "text/javascript">
<!--
ctxt_cee_id = "ceeid";
ctxt_ad_width = 728;
ctxt_ad_height = 90;
ctxt_tag1 = "eucalyptus";
ctxt_objectPref = audio;
//-->
</script>
<script language= "JavaScript" src= "http://ypn-js.yahoo.com/js/enhancer.js">
</script>
```

Fig. 4

TEXT ENHANCEMENT MECHANISM

TECHNICAL FIELD

The present disclosure relates generally to creation, provision, and consumption of multimedia content over interactive networks.

BACKGROUND

Users communicating over a network typically use a physical device, such as a telephone, a text messenger, a cell phone, a personal digital assistant (PDA), a networked audio/video player, a personal computer, or a public terminal, to interconnect and share information with other users on the network. These networked devices provide an increased ability to compose and consume information, and to interact socially through the sharing of information. A user device on a network is sometimes referred to as a host. This disclosure relates generally to an improved mechanism for composing, sharing, disseminating, and consuming various types of information among interconnected users.

The shared information is perceived by a consuming user (consumer). The consumer perceives information conveyed through various forms of media objects, including text, voice, audio recordings, pictures, or videos. Descriptions of one or more forms of media objects may be combined in a data object, which the consumer accesses over the network. The data object may contain additional "metadata" information which is not typically observed by the consumer, but may instead define parameters useful in conveying information to the consumer, such as user identifiers, data locators, data types, or data interpretation resources, as described below. Metadata may combine one of more specialized categories of metadata, such as a "meta identifier", a "meta keyword", and so on.

The consumer experiences a virtual reality, stimulated by a plethora of multimedia information. As opposed to the real world, where social interactions often depend on physical characteristics of the communicator, in a virtual social network the composing user (composer) is limited only by his ability to stimulate others through the sharing of information. Composers on networks are currently able to perform social functions which are analogous to their real world counterparts, such as to compose mail to write diaries, or to publish original works or compositions of other works, all in electronic form over the network.

Modern computer networks are typically hierarchical transmission networks with multiple layers of transmission protocols. A transmission network is a system that allows two or more transceivers to exchange data, whereas a transmission protocol is a sequence of standard interactive steps that facilitate the exchange. Typically, the lowest level protocols are more concretely tied to the interaction of physical circuitry, whereas higher levels of protocols are more abstract to facilitate higher level processing at an algorithmic level. For example, in the vernacular "the web," also known as "the internet," has become shorthand for a multi-layer computer communications system, which combines higher level protocols for access, mid-level protocols, such as a means of locating resources available on the network using a system of uniform resource locaters (URLs), and low-level hardware transmission control protocol/internet protocols (TCP/IP) which control the exchange of large, uneven blocks of data by breaking them into smaller, standardized packets. Generally, the various levels of communication protocols are seamless to the user, who seeks improved means to gather information, compose new information, and share that information with other users, without the burden of managing lower-level protocols or learning new programming languages.

In the context of a computer network, a "server" is physically one or more computer systems connected to the network, containing a set of one or more central processing units (CPUs) and support circuitry operative to execute a sequence of one or more processor instructions to process data. A sequence of one or more processor instructions for a particular purpose or application is known as an application program. Physical circuitry in a server typically includes one or more CPUs, a plurality of interfaces for inputting application programs and data, a plurality of memories for storing programs and data, a plurality of interfaces for outputting programs and data, and a plurality of transceivers for exchanging data and commands with other servers. Data may be organized in storage to facilitate efficient processing, such as by storing the data in a "database" consisting of a collection of data indexed by relationships between the various forms of data contained therein. A "virtual server" consists of a set of one or more servers interconnected hierarchically to perform high-level functions as combined functions of several servers under central control.

Functionally, a server executes a sequence of low-level CPU commands to complete instructions for processing data. A server typically accepts instructions and executes commands for a multitude of remote "clients". The instructions may include, but are not limited to, instructions to store or retrieve data, to modify, verify or erase data, or to reorganize data. The server may also initiate instructions for other network-attached devices. For example, a virtual "music server" might maintain a database to locate a library of musical compositions. The music server might receive commands to store new songs or retrieve old ones from a number of clients. Further, the music server might send commands to other devices on the network, e.g., to disseminate the musical database among various subservient sewers, such as a "jazz server," a "hip-hop server," a "classical server," and so on, to register paying user requests in a "billing server," to verify the identity, preferences, and access privileges of a user in a "registration server" and so on. The "music server" may therefore also be a client of other servers. Practitioners of the art will recognize that servers and clients are abstract interactive devices controlled by software instructions, whose interaction protocols may be flexibly defined. A "client" as used herein may include functionally to process information and programs, as well as to issue commands. Similarly, a "server" as used herein may include functionally to initiate commands to user device(s) and other servers as well as to respond to instructions.

Similarly, a database should not be construed to be a single physical collection of data. As used herein, a database is an abstract collection of data. Said data may be stored physically within a single or multiple servers, within attached physical device(s), network attached device(s), or user devices(s). Similarly, an application program should not be construed to be a single physical collection of commands. As used herein, an application program is an abstract collection of computer-readable commands, which may be physically executed, in whole or in part, within a single or multiple servers, within attached physical devices(s), within network attached device(s), or within user device(s).

A network user utilizes a number of application programs to create or consume content on the network. Example application programs include a "browser," an "e-mail client," a "blog client," and a "media player."

A browser is an application program that is generally intended to display multimedia content. The browser typically displays multimedia content in a virtual book format, typically displayed as one or more individually framed "web pages," along with means for navigating to other related web pages. A web page is typically a two-dimensional image appearing as an individual page of information including one or more types of associated media. A web page may also be associated with consumer perceived audio and/or video output. Data for web pages is often described in a format known as a Document Object Model (DOM).

The multimedia content may be directly perceived on the web page or may be indirectly accessible. Content on the page may be directly perceived by including displayed images, videos, or a media player rendered within the image of the page. Examples of indirect access include access to audio recording media through background music, access through an auxiliary page or pop-up window, access through an auxiliary program such as Microsoft's Windows Media Player®, access through an auxiliary remotely interconnected device such as a networked display, or access provided through a link to another page. Many web pages incorporate one or more "hot links." The hot link enables a consumer to access another web page or another application by pointing to and clicking on the hot link using a pointing device such as a mouse. Consumers typically have the ability to reject the web page or additional media offering(s) through controls in the browser user interface, such as by clicking on a "close box" using the mouse.

A network user may also become a composer to create new web pages. Web pages may be created by any number of individuals, groups, businesses, or automated processes. Web pages are typically stored as a document using a common programming language, such as Hyper Text Markup Language (HTML). The composer may compose the web page directly by creating a description in the common programming language, or may compose the web page indirectly using an application program to combine text descriptions and other media into a page description in HTML or another suitable language. A composer may further combine one or more web pages to create a "website." A website may be self-contained, in that it consists solely of web pages created for that site and a means for navigating among the contained web pages. More commonly, a website contains a combination of composer-generated content as well as links to other content or applications on the web. Typically, the composer may review a new web page or website composition on his computer using his browser. The composer may also disseminate the new web page or website to other users on the network by publishing his page description(s) on a "web server", where a web server is a server connected to the communications network that will provide published web pages in response to requests from authorized users on the network.

To use the web server to publish a page, the composer typically registers with a service-provider, such as Yahoo! Geocities®. Composers who wish to enhance a web page with media content other than text typically complete a cumbersome process of locating and incorporating the content. When the web page(s) are published, the composer and service-provider may be exposed to legal liability for incorporating copyrighted or inappropriate content. Although the composer or service-provider could potentially license the incorporated content, transaction costs may be too high for individual composers.

In addition, the composing user may not have the same access privileges as a consuming user. For example, the composer may have a subscription service to an internet service-provider, which licenses the downloading of music files. A consumer on the network accessing the composition may not have the same subscription-based privileges. The composer seeks to provide additional media content for any consumer, without the burden of determining consumer access privileges.

A popular form of web page for individual users is an online diary, known as a "web log" or "blog." The blog composer is also known as a "blogger." The blogger typically provides textual descriptions of personal experiences and/or other types of publishable information, and shares them with other network users of the network in a sequence of blog pages. Although the blogger desires to enhance blog pages with related media content to create a multimedia experience for the blog consumer, he faces similar difficulties to those encountered by other web page composers. As a result, bloggers typically use the services of a standardized blog composition and display service-provider, such as Yahoo! 360° Blog®. Standardized blog composition services give composers limited control over their compositions. These limitations may include limited access to embeddable media, limited varieties of page composition, and limited access to embeddable media players. Composers generally are limited to locating related media content on their own. In addition, blog displays on a service-provider are typically limited to one scrollable page per user, are accessible only to other users of the service-provider, and the service-provider controls the overall composition of the website.

An e-mail client typically has the option of accessing electronic mail through a specialized e-mail client application or a general-purpose web browser application. Either application allows a user to compose mail messages as well as to consume messages. E-mail messages typically consist of text and optionally include one or more instances of user-attached media objects. The e-mail messages are typically stored in data objects including text and optionally HTML. To use e-mail, the network user typically registers with an e-mail service-provider, such as Yahoo! Mail®. The service-provider typically maintains a virtual e-mail server for its various service customers' use with e-mail client software. The e-mail server provides a facility for e-mail clients to authenticate themselves and interact with the appropriate subservient server. Users who wish to enhance their e-mails with media objects other than text typically complete a cumbersome process of locating, attaching, and uploading the additional content for the enhanced e-mail.

SUMMARY

A text enhancement mechanism for users of computer networks is described. A network composer accesses the services of an enhancement service-provider to obtain embed code that can be used to enhance one or more pages of text entries with media objects. The service-provider provides an additional enhancement mechanism for the text pages. When the composer supplies a page description with text, the enhancement mechanism modifies the page description to produce an enhanced page description, with computer code contained as metadata in the description of the enhanced page. When consumers access an enhanced page, the embed code facilitates one or more of (1) relating one or more text entries of the page to corresponding media to be contained on the page (2) providing an appropriate representation for the consumer to perceive each corresponding media, (3) augmenting the text page to produce an enhanced page displaying the appropriate representation of other media in the page, and (4) combining the enhanced pages in an enhanced multimedia experience for the consumer, such as an enhanced website, an enhanced blog, or enhanced e-mail communications.

DESCRIPTION OF THE DRAWINGS

FIG. 4 is example software code that can be embedded in a text message.

DESCRIPTION OF EXAMPLE EMBODIMENT(S)

The following embodiments and aspects thereof are described and illustrated in conjunction with systems, apparatuses and methods which are meant to be exemplary and illustrative, not limiting in scope. In various embodiments, one or more of the above-described problems have been reduced or eliminated.

The following description sets forth numerous details to provide a thorough understanding of various aspects of the present invention. It will be apparent to those skilled in the art, however, that the present invention may be practiced without these specific details. In other instances, algorithms for processing data and symbolic representations of algorithmic operations are the terms used by those skilled in the art to most effectively convey the substance of their work to others skilled in the art. An algorithm, as used herein, is a sequence of operations leading to a desired result, said operations requiring physical manipulations of physical quantities. Usually, though not necessarily, these quantities take the form of a sequence of electrical signals representing binary numbers which can be stored, transferred, combined, compared, and otherwise manipulated.

The present invention also relates to apparatus for performing the operations herein. This apparatus may be specially constructed for the required purposes, or it may comprise one or more general-purpose computers selectively activated by one or more computer programs to achieve the required results. Such a computer program may be stored in any suitable machine-readable storage medium. A machine-readable storage medium includes any mechanism for storing or transmitting information in a form that is usable by a machine, such as a general-purpose computer.

The algorithms and displays presented herein are not inherently related to any particular computer or other apparatus. Various general-purpose systems may be used in accordance with the teachings herein, and it may prove expedient to construct more specialized apparatus to perform the algorithm operations. The required structure for a variety of these systems may appear from the description below. In addition, the present invention is not described with reference to any particular programming language. Those skilled in the art will appreciate that a variety of programming languages may be used to implement the teachings of the invention as described herein.

Figure 1:
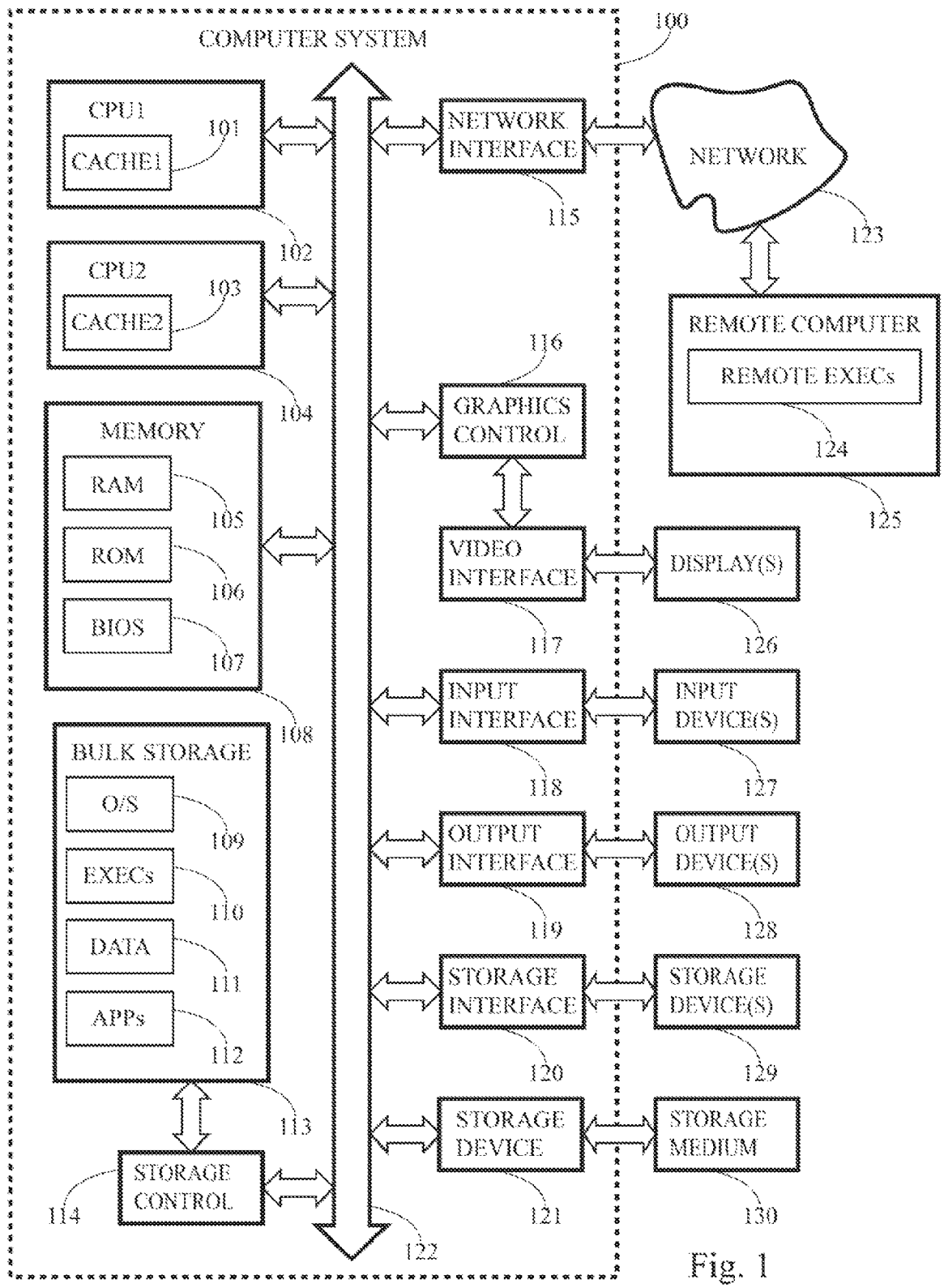
FIG. 1 is a block diagram of computer system architecture.

Server systems described herein can be implemented by a variety of computer systems and architectures. FIG. 1 illustrates suitable components in an exemplary embodiment of a general purpose computer system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computer system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Computer system 100 accesses one or more applications and peripheral drivers directed to a number of functions described herein. Components of the computer system 100 may include, but are not limited to, a CPU or central processing unit 102, a system memory 108, and a system bus 122 that couples various system components including the system memory 108 to the processing unit 102. As used by those skilled in the art, a signal "bus" refers to a plurality of digital signal lines serving a common function. The system bus 122 may be any of several types of bus structures including a memory bus, a peripheral bus, and a local bus using any of a variety of bus architectures. By way of example, and not limitation, such architectures include Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

An operating system manages the operation of computer system 100, including the input and output of data to and from applications (not shown). The operating system provides an interface between the applications being executed on the system and the components of the system. According to one embodiment of the present invention, the operating system is a Windows® 95/98/NT/XP/Vista operating system, available from Microsoft Corporation of Redmond, Wash. However, the present invention may be used with other suitable operating systems, such as an QS-X® operating system, available from Apple Computer Inc. of Cupertino, Calif., a UNIX® operating system, or a LINUX operating system.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, random access memory (RAM), read-only memory (ROM), electrically erasable programmable ROM (EEPROM), flash memory or other memory technology, compact-disk ROM (CD-ROM), digital versatile disks (DVD) or other optical disk storage, magnetic tape cassettes, magnetic tape, hard magnetic disk storage or other magnetic storage devices, floppy disk storage devices, magnetic diskettes, or any other medium which can be used to store the desired information and which can accessed by the computer system 100.

Communication media may also embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared, cellular networks, and other wireless media.

The system memory 108 includes computer storage media in the form of volatile and/or nonvolatile memory such as read only memory (ROM) 106 and random access memory (RAM) 105. A basic input/output system 107 (BIOS), containing the basic routines that help to transfer information between elements within computer system 100, such as during start-up, is typically stored in ROM 106 and other non-volatile storage, such as flash memory. Additionally, system memory 108 may contain some or all of the operating system 109, the application programs 112, other executable code 110 and program data 111. Memory 108 typically contains data and/or program modules that are immediately accessible to and/or presently being operated on by CPU 102. Optionally, a CPU may contain a cache memory unit 101 for temporary local storage of instructions, data, or computer addresses.

The computer system 100 may also include other removable/non-removable, volatile/nonvolatile computer storage media. By way of example only, FIG. 1 illustrates a bulk storage device 113 that reads from or writes to one or more hard drives of non-removable, nonvolatile magnetic media, and storage device 121 that may be an optical disk drive or a magnetic disk drive that reads from or writes to a removable, a nonvolatile storage medium 130 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. Bulk storage device 113 and the storage device 121 may be connected directly to the system bus 122, or alternatively may be connected through an interface such as storage controller 114. Storage devices may interface to computer system 100 through a general computer bus such as 122, or may interconnect with a storage controller over a storage-optimized bus, such as the Small Computer System Interface (SCSI) bus, the ANSI ATA/ATAPI bus, the Ultra ATA bus, the FireWire (IEEE 1394) bus, or the Serial ATA (SATA) bus.

The storage devices and their associated computer storage media, discussed above and illustrated in FIG. 1, provide storage of computer-readable instructions, executable code, data structures, program modules and other data for the computer system 100. In FIG. 1, for example, bulk storage 113 is illustrated as storing operating system 109, application programs 112, other executable code 110 and program data 111. As mentioned previously, data and computer instructions in 113 may be transferred to system memory 108 to facilitate immediate CPU access from processor 102. Alternatively, processor 102 may access stored instructions and data by interacting directly with bulk storage 113. Furthermore, bulk storage may be alternatively provided by a network-attached storage device (not shown), which is accessed through a network interface 115.

A user may enter commands and information into the computer system 100 through the network interface 115 or through an input device 127 such as a keyboard, a pointing device commonly referred to as a mouse, a trackball, a touch pad tablet, a controller, an electronic digitizer, a microphone, an audio input interface, or a video input interface. Other input devices may include a joystick, game pad, satellite dish, scanner, and so forth. These and other input devices are often connected to CPU 102 through an input interface 118 that is coupled to the system bus, but may be connected by other interface and bus structures, such as a parallel port, a game port or a universal serial bus (USB). A display 126 or other type of video device may also be connected to the system bus 122 via an interface, such as a graphics controller 116 and a video interface 117. In addition, an output device 128, such as headphones, speakers, or a printer, may be connected to the system bus 122 through an output interface 119 or the like.

The computer system 100 may operate in a networked environment using a network 123 to one or more remote computers, such as a remote computer 125. The remote computer 125 may be a terminal, a personal computer, a server, a router, a network PC, a peer device or other common network node, and typically includes many or all of the elements described above relative to the computer system 100. The network 123 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 124 as residing on remote computer 125. It will be appreciated that the network connections shown are exemplary and other means of establishing a communications link between the computers may be used.

Collectively, these elements are intended to represent a broad category of computer systems, including but not limited to general purpose computer systems based on a member of the "x86" family of CPU's manufactured by Intel Corporation of Santa Clara, Calif., and the x86-compatible CPUs manufactured by Advanced Micro Devices (AMD), Inc., of Sunnyvale, Calif., as well as any other suitable processor. Of course, other implementations are possible. For example, the server functionalities described herein may be implemented by a plurality of server sub-systems communicating over a backplane.

Various components of computer system 100 may be rearranged, deleted, or augmented. For example, system bus 122 may be implemented as a plurality of busses interconnecting various subsystems of the computer system. Furthermore, computer system 100 may contain additional signal busses or interconnections between existing components, such as by adding a direct memory access unit (not shown) to allow one or more components to more efficiently access system memory 108.

As shown, CACHE1 and CPU1 are packed together as "processor module" 102 with processor CPU1 referred to as the "processor core." Alternatively, cache memories 101, 103, contained in 102, 104 may be separate components on the system bus 122. Furthermore, certain embodiments of the present invention may not require nor include all of the above components. For example, some embodiments may include a smaller number of CPUs, a smaller number of network ports, a smaller number of storage devices, or a smaller number of input-output interfaces. Furthermore, computer system 100 may include additional components, such as one or more additional central processing units, such as 104, storage devices, memories, or interfaces. As discussed below, in one implementation, operations of one or more of the physical servers described herein is implemented as a series of software routines executed by computer system 100. Each of the software routines comprises a plurality or series of machine instructions to be executed by one or more components in the computer system, such as CPU 102. Initially, the series of instructions may be stored on a storage device, such as bulk storage 113. However, the series of instructions may be stored in an EEPROM, a flash device, or a DVD. Furthermore, the series of instructions need not be stored locally, and could be received from a remote computer 125 or a server on a network, via network interface 115.

Figure 2:
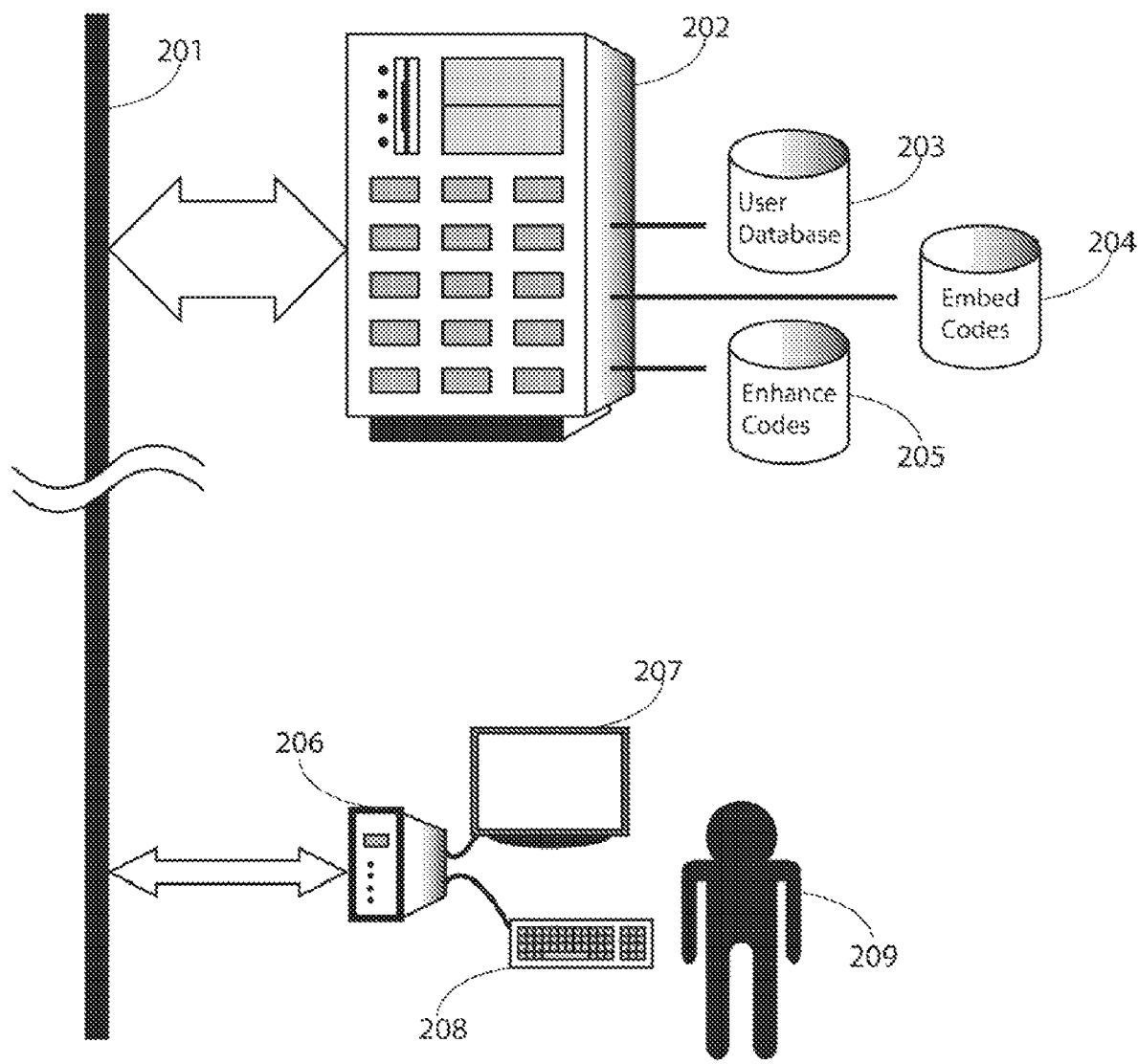
FIG. 2 is an illustration of a client-server system for service registration.

FIG. 2 illustrates a client-server system, where an enhancement service-provider registers a plurality of users. User 209 is able to communicate over a network 201 through the use of a network client application, such as a web browser. User 209 typically has a network access device 206, such as a computer, a text input device 208, such as a keyboard, and observes a two-dimensional display 207, such as a monitor. The enhancement service-provider operates a virtual registration server 202 on the network 201 which maintains a registration website (not shown), a database of user identities 203 and a plurality of databases of computer software code 204, 205 to enable network users to access an enhancement service. Server 202 is operative to register new users and to supply appropriate software code. Server 202 implements a registration process which may include (1) determining whether the user is a new or a returning user, (2) authenticating the returning users, (3) storing a set of user preferences, (4) retrieving a set of user preferences, and (5) enabling use of the enhancement service by providing one or more embed codes. The embed codes are operative to provide an enhanced page composition and rendering service operating within the context of a general-purpose client application, such as a web browser. Optionally, server 202 may be operative to provide one or more user device software codes, referred to hereinafter as an "enhancing code." The enhancing code is operative to functionally replace, augment, or modify a user application program, such as a browser, to enable one or more additional enhancement steps in the composition or rendering of pages.

Figure 3:
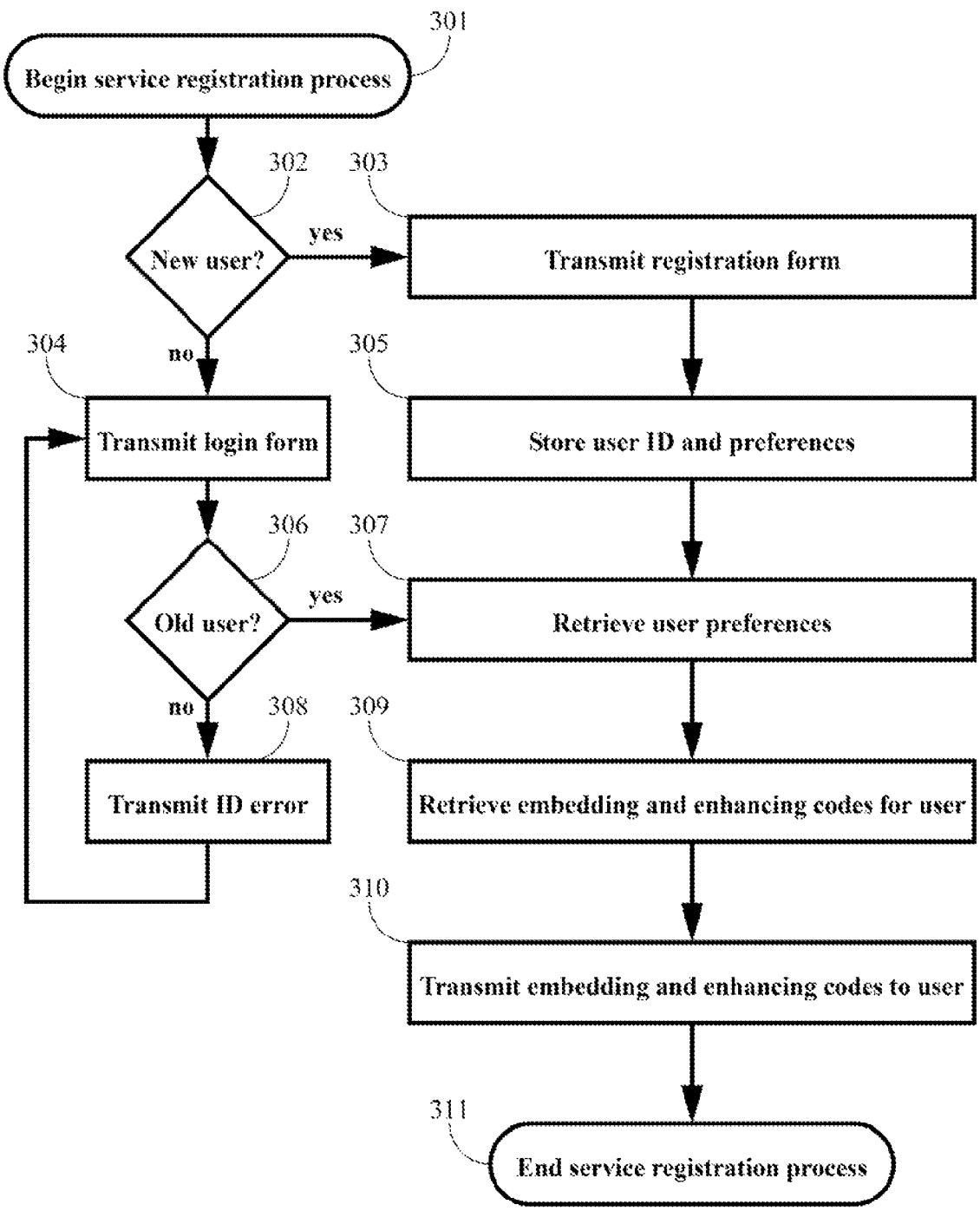
FIG. 3 is a flowchart illustrating an example service registration process.

FIG. 3 is a flowchart representing a service registration process consisting of a number of software steps. Components in a service-provider's registration server 202 execute machine-readable instructions to implement the software steps. The registration process scans user input to determine whether a user accessing the server is a new user or an old returning user in step 302. With new users, the registration process scans entries on an online registration form in step 303 to determine and store a unique user identifier (ID) in the user database 203 in step 305. Optionally, the registration server executes commands to store user preferences.

The registration process authenticates returning users by scanning input to an online login form 304 to determine if the login ID resides in the user database 203 in step 306. The user may use the registration process as a named known user or as a guest user. Once a user has been properly identified, user preferences are retrieved from storage in step 307. Users opting for anonymous use of the process are assigned a default guest profile. The user preferences may relate to one or more parameters or attributes of the operation of the enhancement mechanism. For example, the user preferences may include parameters that bias or control selection of photographic media objects over video/audio media objects. In step 309, registration server 202 retrieves, and in some instances, dynamically generates a set of appropriate embed and enhancing codes, and transmits the codes to a user device 206 in step 310. The output of the service registration process is operative to provide a text enhancement mechanism, where the user may insert the embed code in underlying content, such as an HTML page. For dynamically generated code, the server may dynamically add a meta user identifier to the code, as well as one or more user preferences. These meta parameters can be used to bias the selection of media, as described below, to allow for composer personalization.

The enhancing code is operative to facilitate the enhancement mechanism for composer applications. The composition-enhancement mechanism consists of inserting one or more embed code sections in association with text content contained in data objects, such as HTML pages. In one implementation, the output of the registration process is limited to a set of embed code sections, which the user can copy and paste into text documents. In an alternate implementation, an enhancing software code module may assist the user in using embed code sections during composition of data objects. The enhancing software code module may be provided in various forms, as described below. The enhancing code is operative to facilitate the composition-enhancement mechanism by assisting the user in inserting embed code in the data object by providing additional functionality to a composer application.

Embed code may take many forms. For example, the embed code may be high-level computer language source code, such as HTML code, or low-level computing machine instructions. Embed code may also include or link to one or more scripts, such as JavaScript, expressing functions that are included from HTML code. One or more sections of the embed code may contain a script, or calls to retrieve a script, that dynamically generates one or more aspects of the enhanced page or other content provided when the embed code is executed. The dynamic generation of the enhanced page may even be automatically achieved without any explicit intervention required of the composer to apply the enhancement. This could be achieved, for example, by programmatically examining the composition for content references which qualify for enhancement and applying the enhancements dynamically at the time of consumption.

FIG. 4 is an example embed code that can be included in a data object, such as an HTML page. The script language and type of source code is identified in the first line. The script is used to retrieve and render a media object on a displayed page. In this example, various data describing the media object to be displayed are listed in a header section. The header data optionally may include various parameter identifiers, including a user identifier, height and width of the displayed object in pixels, and meta keywords associated with the media object, "eucalyptus" and "leaf." As discussed, some of these meta parameters, such as keywords and formatting parameters, may be included in the embed code as a result of explicit commands from a user. The embed code further identifies an additional remote set of computer instructions in the form of an external script for retrieving and rendering the object, provided by a network resource locater (http://ypn-js.yahoo.com/js/enhancer.js).

When a consumer accesses an enhanced page, script functions can interact with the Document Object Model (DOM) of the page to perform one or more tasks. Scripts may also be used to make service requests to remote servers after an HTML page has loaded. These requests can obtain new information or data, as well as load or launch additional applications, e.g., media players, content viewers, etc., application plug-ins, or software codes. Script code can merge with the DOM of the underlying page so that one or more additional media objects are displayed or otherwise rendered on the page. Alternatively, the script code may initiate one or more additional pages or other rendering for the additional media object(s). When embed code is inserted into an HTML document and subsequently accessed by a client application, the client application may retrieve and execute the script. The script, optionally using the parameter values in the embed code, may initiate service requests to one or more remote servers to retrieve and render one or more media objects that enhance the underlying content of the page. For example, the script, when executed, may cause the client application to query media server 502 to retrieve one or more media objects, and then cause a client application to render the retrieved media object(s).

Figure 6:
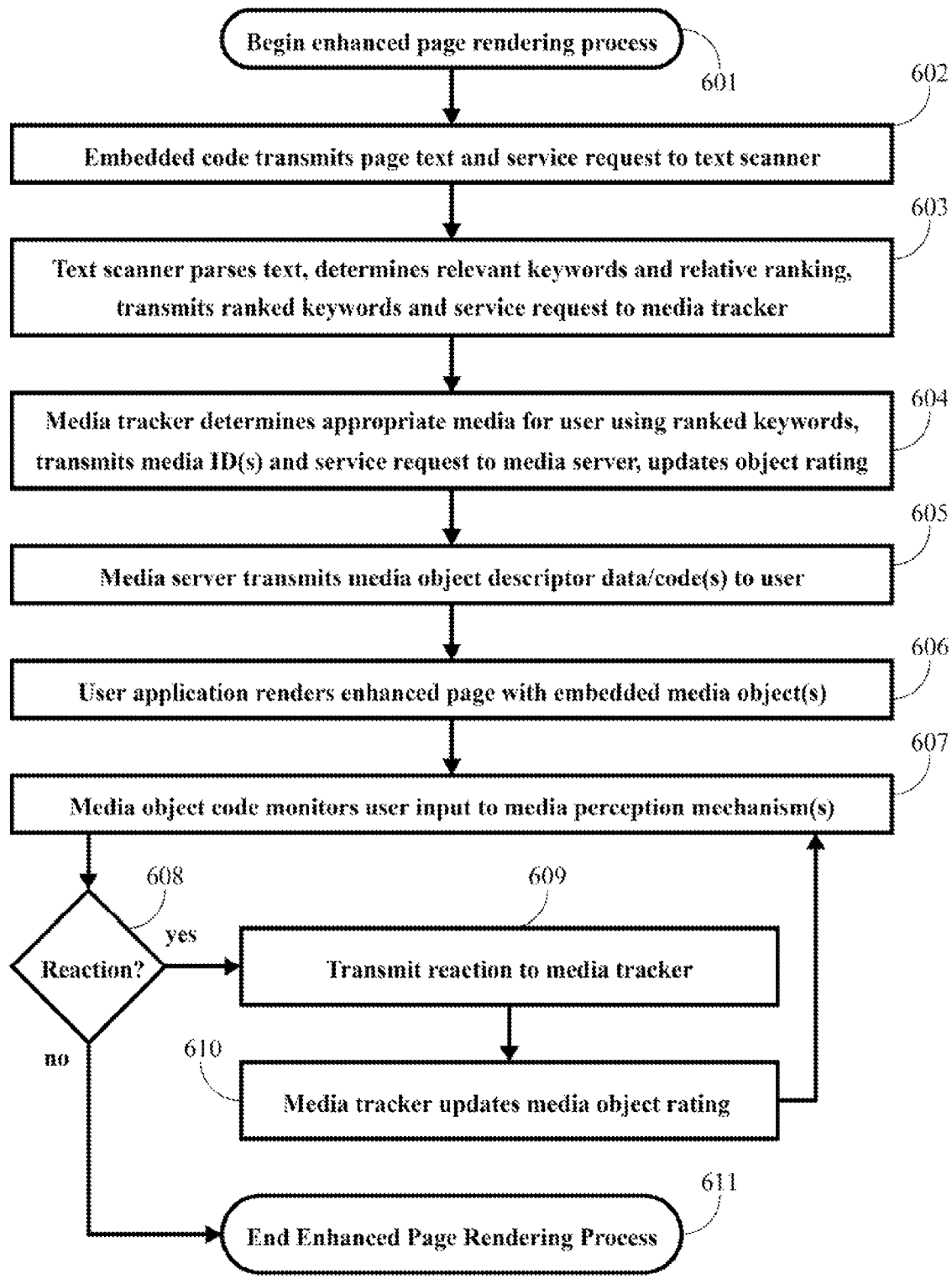
FIG. 6 is a flowchart showing an example enhanced page rendering process.

In addition, the script may access the DOM of the underlying HTML page to extract and process information. For example, as FIG. 6 illustrates, the script may process the data of the underlying HTML page to extract the text of the page and provide it to media server 502. The script could also perform additional operations. For example, the script could process the data of the HTML page, filtering out extraneous information such as "the", "a", "and", and the like, and transmit only the relevant media selection information when querying for media objects for page enhancement. In addition, the script may access the DOM to identify the server (identified, in one possible implementation, by uniform resource locater) that hosts the underlying HTML page.

Another way to detect underlying or theme information of a data object is to read the metadata in the data object in an automated way. In an alternative implementation, the script may extract one or more meta parameters that may be useful, for example, to select one or more media objects. For example, a photographic media object may include additional information about the photograph in one or more "meta tags" in the metadata. An example meta tag includes <meta name="keywords" content="photography, digital photography, camera phones, camera">. A mechanism for automatically retrieving information in the data object is known as a page-scraping mechanism. The page-scraping mechanism retrieves text in metadata as well as user composed text. However, the page-scraping mechanism may also employ non-textual methods for retrieving information about the page by digitally processing and recognizing and recognizing the intrinsic properties of media objects included in the page. For example, the image on the page may include no meta tags, but by processing the image it could be determined that the image features a camera phone. Retrieved text or media is used to determine a page theme using technology for determining semantic meaning. Metadata as provided by the user or a media object supplier would be valuable to understand the theme of the data object. Using this information and the text content of the page, a semantic engine may select one or more relevant topics from a dictionary, and may select one or more relevant media objects to enhance the page.

In addition, the enhancement mechanisms disclosed may employ a categorization tool to characterize data object text or metadata. Categories can be associated with one or more keywords. For example, a meta tag containing "photography" and text describing the Grand Canyon may be characterized as a category of photographs that came from Arizona and may be associated with a keyword, entitled "ArizonaPics."

In addition, the enhancement mechanisms disclosed may employ mechanisms for consumer personalization. When a network information consumer accesses a data object using a browser, for example, script code may access consumer identifiers in a consumer "cookie" or some other consumer data file. The cookie or data file is a data object containing one or more meta parameters specific to the consumer. By accessing the consumer's meta parameters, an embed code may optionally include instructions to bias the selection of media to include consumer preferences and/or consumer access privileges in a service request.

After registration, embed code can be provided to the user as displayed text, as a displayed HTML page, in a text or other data file. After the user has been provided displayed embed code, the user may save the embed code in a text or other data file, or load the embed code in a buffer with a "copy" operation, such as by highlighting the text and entering "Ctrl-C" to copy the highlighted text in a buffer in the Windows® operating environment. The user may insert the embed code into one or more data objects, such as HTML pages in a variety of circumstances. For example, when configuring a blog post, a user may paste the embed code into the HTML code of the blog page. Blog posting (and other network application) interfaces typically include an "edit HTML" tab that allows a user to directly edit the HTML code of the blog post. The embed code may be incorporated into a variety of data objects. Indeed, a blog post represents one of many possible forms of social media in connection with which the content-embedding code can be used. For example, the embed code may be incorporated into personal pages on social networking sites, such as MySpace.com, Facebook, Yahoo! 360, and the like. The embed code may also be used in other contexts. For example, the embed code may be entered into a thread on a public forum site. Still further, a webmaster or other user may include the content-embedding code into one or more pages of a web site, such as a commercial news site (e.g., cnn.com, zdnet.com, etc.).

Figure 5:
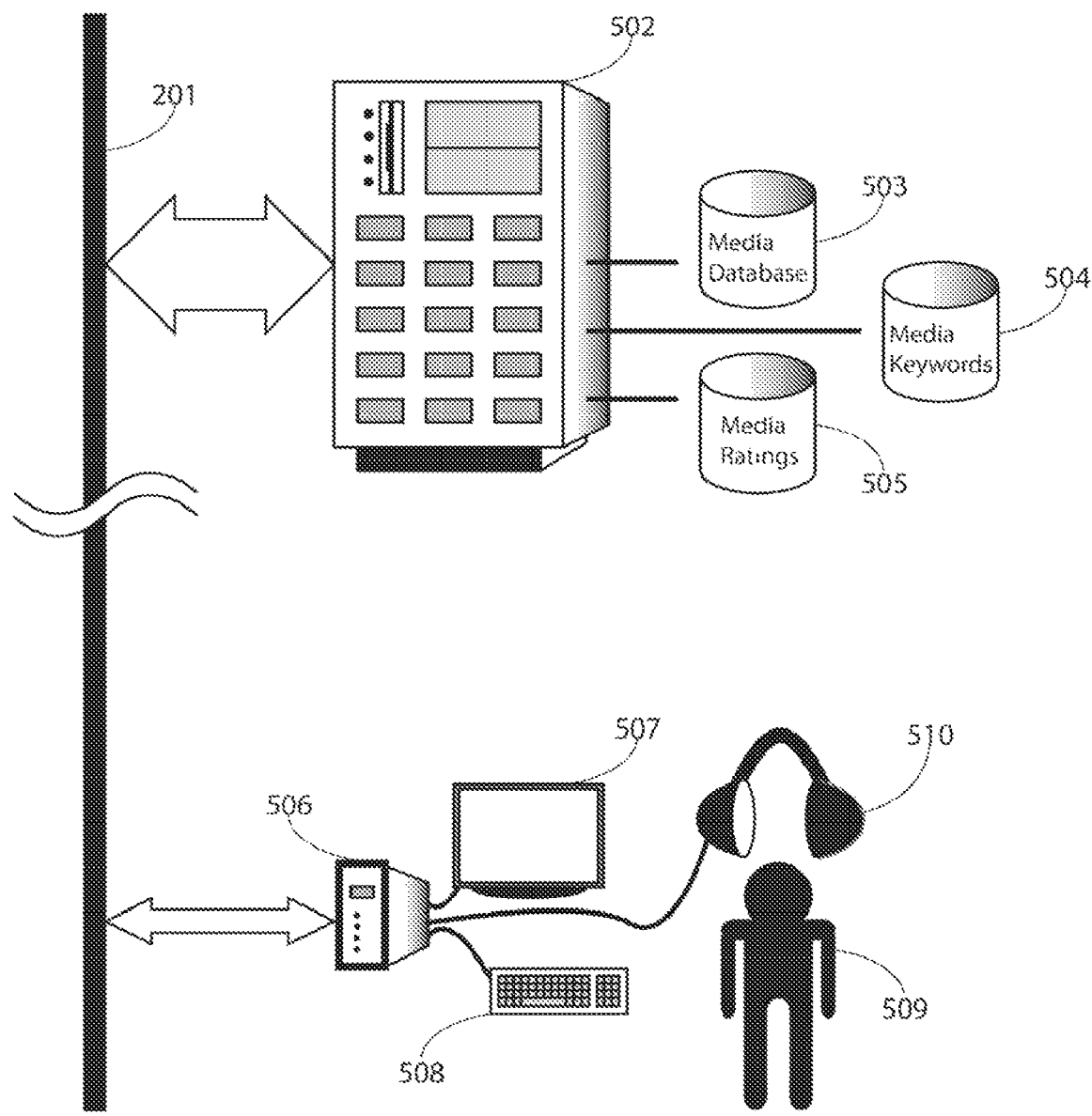
FIG. 5 is an illustration of a client-server system providing enhanced pages.

FIG. 5 illustrates a client-server system over network 201, where an enhancement service-provider supplies one or more additional media objects to enhance a page display for a network information consumer. Assume for didactic purposes, that a first user has created a blog entry including text and embed code as described above. As a result of the processes described herein, the consumer 509 perceives the text of the blog entry and additional media content. The additional media content is rendered as one or more visual objects on a visual display 507 and/or one or more audio passages produced by an auditory transducer, such as a pair of headphones 510.

The additional media content is rendered by execution of software on a user device 506. User device 506 executes embed code in the context of a user application, such as a web browser. The service-provider operates a virtual media server 502 which maintains a database of media object descriptor files 503, a database 504 to reference relationships between media objects using media-describing keywords, and a database for media object preferences 505. The media object descriptor files may include "mp3" format descriptions of audio files, "jpeg" format descriptions of photographs, "mpeg4" format descriptions of videos, and one or more additional standardized media object descriptors. Server 502 is operative to transmit one or more additional media objects to the user device 506 in response to one or more embed code service requests. The additional media objects are transmitted in the form of one or more data descriptor files and, optionally, one or more software code modules for perceiving an additional media object.

For example, an additional media object may consist of a digital photograph associated with a textual description. User 509 may perceive a page where the subject or theme of the photograph is described in text, and the enhancement mechanism renders an additional media object consisting of a representation of the photograph rendered on the perceived page.

The user may perceive the additional media object in various representations. In one alternative, the entire media object is rendered, such as by providing an image of an entire photograph on a page on display 507. In a second alternative, a compressed version of the additional media object is rendered on the page. In a third alternative, a link to the additional media object is included on the page. In a fourth alternative, the additional media object is associated with a media player control interface displayed on the page. For example, an additional media object consisting of a photographic object may be displayed by a combination of these and other representations. As will be appreciated by those skilled in the art, these and various other means of display commonly create a perception of a representation of a photographic media object on a page.

In addition, user 509 may optionally be provided with one or more display controls to alter the display of the representation of the media object, such as by resizing or rejecting a displayed photograph using one or more user application interface controls. Alternatively, user 509 perceives a compressed form of the media object, and may optionally alter the representation using application interface controls to reject the compressed version or to view an uncompressed version. User 509 may optionally initiate additional service requests indicated by one or more links, or by further interacting with the media object control interface.

As a consequence of these alternative representations and the user application interface controls, user 509 may not be able to view an entire additional media object on the page at all times. A particular space on the page may be reserved for a representation of the media object or the media object control interface. When user 509 does not perceive the additional media object, the space may be available to display one or more other media objects. For example, user 509 may be done viewing an additional media object consisting of a photograph in a certain space on the page, and the space dedicated to all or part of the photographic image may be optionally replaced with one or more media objects provided by server 502.

As a second example, a consuming user 509 in FIG. 5 may perceive a page where a music video is described in text, and the enhancement mechanism renders a representation of an additional media object consisting of the corresponding video. The video data may alternatively be transmitted by the media server as a data file corresponding to the entire video, as sequentially transmitted portions of the video data file contained in a data stream, as a data file corresponding to a photographic title image of the video, or by some other representation. The video representation is rendered as part of a displayed page on display 507, and may consist of a video player with a video control interface contained on the displayed page. The video player is operative to process user input, a video data descriptor file, a video data stream, or a title image to render a representation of the video. In one means of display, the entire video is rendered on the page, and the client may be provided optional controls which may include a user application interface to pause, play, rewind, fast-forward, or reject the additional video media object. In a second means of display, the photographic title image or an alternative compressed representation of the video is rendered on the page. The user perceives the compressed representation of the video, and may optionally view the uncompressed video or reject the compressed representation on the display. In a third means of display, a link to the video is rendered on the page, and the user may optionally perform a control action to perceive the video. If the user does not perceive the video at all times, or the video data stream (if any) ends, the space on the page dedicated to all or part of the video player may be optionally replaced with other media objects provided by server 502.

FIG. 6 is a flowchart representing an enhanced page rendering process. As discussed above, an enhanced page rendering process may be initiated when a network consumer accesses a page of text, such as a blog, having an embed code section inserted by the page composer or an assisting enhancement mechanism. In FIG. 6, the enhancement process is initiated in step 602 when a client application, such as a browser, consumes the embed code (possibly downloading a script or other code module) and transmits a service request and all or some of the page text to the media server 502. The server request may include metadata in the embed code as well as metadata to identify the network consumer.

In FIG. 6, a text scanner function is operative in step 603 to (1) resolve ambiguities in the transmitted page text, (2) parse the transmitted page text into a set of one or more likely media-identifying phrases, (3) associate one or more of the media-identifying phrases with one or more media-describing keywords, and (4) prioritize the associated keywords by ranking each such keyword. Optionally, the text input to the text seamier may already contain metadata with one or more predetermined media-identifying phrases, keywords, or rankings. The text scanner function is further operative to forward ranked keywords and a service request to a media tracker function in step 604. As mentioned previously, the text scanner function is a software routine that may be executed in whole or in part by executing instructions in a server system and by executing instructions for the remainder of the software routine (if any) in a user device.

In FIG. 6, the media tracker function in step 604 is operative to determine one or more data objects in a virtual media database to associate with the ranked keywords. The media tracker function may additionally utilize individual user preferences, service-provider preferences, the combined preferences of multiple users, and/or consumer identifiers to bias the determination of appropriate media. The various preferences may be stored in a media ratings database, such as 505 of FIG. 5. Optionally, the input to the media tracker function in step 604 may already contain predetermined media identifiers in metadata. The media tracker function is further operative to forward appropriate media identifiers and a service request to a media server, such as 502 of FIG. 5. Optionally, the media tracker function is operative to update the combined preferences of multiple users as described below.

In FIG. 6, the media server is operative to transmit one or more additional media objects in step 605 and, if necessary, one or more software code modules (such as a media player) for perceiving that media to the user's device. The user's application, in conjunction with the embed code, renders an enhanced page on the user's device including a representation of one or more additional media objects in step 606.

In FIG. 6, the embed code optionally incorporates additional functionality to monitor a user reaction to the enhanced media in steps 607 to 610. The reaction may be an explicit action of the user, or it may be an implicit action. For example, the associated media to be displayed on an enhanced page may be a sequence of music videos, rendered as a playlist in a media player control panel which is displayed on the enhanced page, showing the video title image and interface controls for the media player. A user may implicitly rate the media by ignoring the media player altogether, or by playing some portion of the videos, or the user may explicitly rate the video selection in response to a request initiated by the embed code. Optionally, the embed code may be operative to input explicit ratings or to derive implicit ratings based on the reaction of the user to the media player in step 608. Optionally, the embed code is operative, in conjunction with the media tracker function and the user application, to adaptively adjust the rating preferences of multiple users by transmitting a contributing rating preference in step 609 to the media tracker function. The media tracker function updates combined user rating preferences in step 610.

Figure 7:
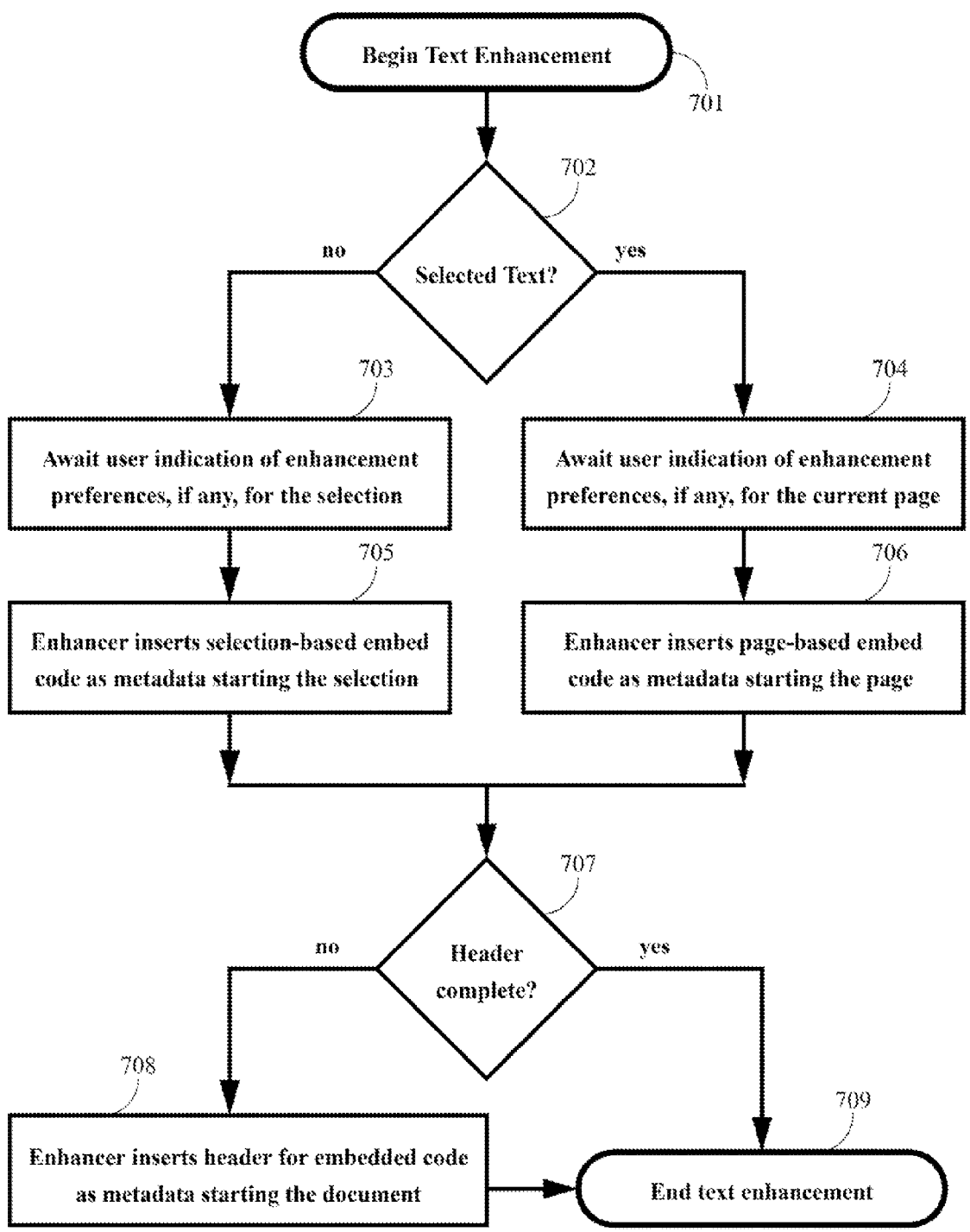
FIG. 7 is a flowchart providing an example text enhancement process.

As discussed above, the operations of inserting embed code in underlying data objects, such as HTML pages, may be facilitated and/or partially automated with the aid of one or more enhancing code modules, such as a client-side browser toolbar or plug-in. The client side application may access embed code stored locally or stored remotely on a server. In FIG. 7 is a flowchart representing an example text enhancement process for a user who composes one or more pages of text. The process begins in response to a user application interface control action, such as clicking on an "Enhance" button displayed on a toolbar of a user application, or by locating "Enhance" on a pull-down user application menu of "Tools". The example enhancement process depends on the nature of the text to be enhanced in step 702. If the user indicated a selection of a subset of the text page prior to beginning enhancement, only that selection of text is enhanced; otherwise, the entire currently observed page is enhanced. In either case, a software routine, such as step 703 or 704, displays a list of possible user preferences (if any) in this enhancement process. The user selected preferences are encoded as a header for the embed code. The embed code augments the user text as metadata contained on the page. If a user text selection has been indicated, the embed code with header is inserted at the beginning of the selection in step 705; otherwise the embed code with header is inserted at the beginning of the page in step 706. Software routines that are common to a plurality of embed codes are contained in a document header section of metadata. The enhancer checks that the appropriate header for the embed code is included at the header of the document in step 707, and if not, inserts the appropriate header code in step 708.

For example, a text composing user might compose a page of text in a blog entry describing a concert as follows. "The cheerleading squad gathered at Adrian's, so we could carpool to the Prince concert. We arrived at Shoreline Amphitheatre at 7 PM, but the place was already a madhouse. The warm-up was Sheila-E, and Prince didn't come out on stage until 9 PM. He was great, and appeared in a big cloud of purple smoke. The encore was Purple Rain."

In a text-selection enhancement mode, the user may indicate a sequence of desired enhancements by effectively performing part of the text scanner and media tracker functions. The user may indicate desired phrases to be enhanced, such as (1) by highlighting the phrase "cheerleading squad" and indicating that a related local picture is desired, (2) by selecting the phrases "Prince concert," "Purple Rain," "encore," and indicating a related music video is desired, and (3) by selecting the artist "Sheila-E" and indicating any related media object is desired, and so on. The user implicitly rates the importance of the various selections, or may explicitly indicate their relative importance through indication of user preferences.

In a full-page enhancement mode, the page enhancement mechanism automatically processes the page text to determine a number of media objects to be inserted on the enhanced page. The text scanner function may identify media-identifying phrases such as "Prince concert," "Purple Rain," "Shoreline Amphitheatre," "Sheila-E," "carpool," "cheerleading squad", "encore" and so on, and associate each phrase with a keyword. Considering the text page as a whole to be highly related to musical artists and to an artist named Prince in particular, the text scanner function may additionally increase the rank of keywords related to musical performers, and may additionally increase the rank of keywords associated with the artist Prince. The media tracker function selects media objects related to the ranked keywords. The media tracker's selection may be based on a number of preferences, such as one or more most-popular objects in a set of global preferences, one or more highest-paying media objects in a set of service-provider preferences, or one or more media objects personally preferred by the text composing user.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method comprising
receiving, from a client host, a request for embed code for a user application with an application programming interface;
generating embed code comprising computer-readable instructions operative, when executed, to cause a client host processor to:
scan a web page, wherein the web page includes text and the embed code;
extract at least a portion of the text of the web page based, at least in part, on the embed code;
transmit a media object request and the extracted text to one or more remote server systems;
receive, from the one or more remote server systems, a response to the media object request including one or more media objects associated with the transmitted text; and
insert the one or more media objects into the web page;
transmitting a response to the client host, wherein the response includes the embed code;
responsive to receiving the media object request and the transmitted text resulting from execution of the embed code on the client host,
parsing the transmitted text to determine one or more keywords;
rating the relative importance of the determined keywords;
searching one or more databases that include one or more potential media objects;
accessing one or more ranking attributes of the one or more potential media objects;
combining the rating and ranking attributes to determine a priority of the potential media objects;
identifying the one or more media objects associated with the transmitted text based, at least in part, on the determined keywords, the priority of the potential media objects, and the search; and
returning the one or more media objects to the client host in the response to the media object request.

2. The method of claim 1 further comprising accessing a content consuming entity identifier in the media object request resulting from execution of the embed code; and wherein the identifying the one or more media objects is biased by one or more account attributes associated with the content consuming entity identifier.

3. The method of claim 2 wherein the one or more account attributes comprise user preferences.

4. The method of claim 2 wherein the one or more account attributes comprise user access privilege information.

5. The method of claim 4 further comprising
accessing one or more attributes of the consuming user identified in the media object request;
determining access privileges for the content consuming user from the one or more attributes of the consuming user;
determining one or more of the potential media objects the consuming user has privilege to access; and
restricting the identification of the one or more media objects associated with the transmitted text to enforce the user access privileges.

6. The method of claim 1 further comprising
determining an identifier for a user associated with the request for embed code; and
adding the requesting user identifier as a content embedding entity identifier to the embed code.

7. The method of claim 6 further comprising
responsive to receiving the media object request resulting from execution of the embed code on a client host,
identifying the one of more media objects associated with the transmitted text, wherein the identifying the one or more media objects is biased by one or more account attributes associated with the content embedding entity identifier; and
returning the one or more media objects to the client host in the response to the media object request.

8. The method of claim 1 wherein the embed code further comprises machine-readable instructions operative to cause the host processor to define one or more media object player interfaces to be associated with the one or more media objects, and optionally retrieve one or more code modules corresponding to the one or more media object player interfaces.

9. The method of claim 1 further comprising accessing one or more media object ratings corresponding to the one or more media objects; and wherein the identifying the one or more media objects is biased by the one or more media object ratings.

10. The method of claim 1 wherein the embed code is further operative to cause the host processor to access a script including one or more instructions for:
scanning the web page;
extracting the at least the portion of the text of the web page;
transmitting the media object request and the extracted text to the one or more remote server systems;
receiving, from the one or more remote server systems, the response to the media object request including the one or more media objects associated with the transmitted text; and
inserting the one or more media objects into the web page.

11. The method of claim 1 wherein the embed code comprises HTML or other similar source code.

12. The method of claim 1 wherein the embed code contains JavaScript or other similar code.

13. A computer-readable medium comprising computer-readable instructions operative, when executed, to cause one or more processors to:
receive, from a client host, a request for embed code for a user application with an application programming interface;
generate embed code comprising computer-readable instructions operative, when executed, to cause a client host processor to:
scan a web page, wherein the web page includes text;
extract at least a portion of the text of the web page based, at least in part, on the embed code;
transmit a media object request and the extracted text to one or more remote server systems;
receive, from the one or more remote server systems, a response to the media object request including one or more media objects associated with the transmitted text; and
insert the one or more media objects into the web page;
transmit a response to the client host, wherein the response includes the embed code;
responsive to receiving the media object request and the transmitted text resulting from execution of the embed code on the client host,
parse the transmitted text to determine one or more keywords;
rate the relative importance of the determined keywords;
search one or more databases that include one or more potential media objects;
access one or more ranking attributes of the one or more potential media objects;
combine the rating and ranking attributes to determine a priority of the potential media objects;
identify the one or more media objects associated with the transmitted text based, at least in part, on the determined keywords, the priority of the potential media objects, and the search; and
return the one or more media objects to the client host in the response to the media object request; and
wherein one or more sections of the embed code are embeddable into the web page; and wherein one or more sections of the embed code are executable within the context of a client application that consumes the web page.

14. A method comprising
storing embed code comprising computer-readable instructions operative, when executed, to cause a host processor to:
scan a web page, wherein the web page includes text and the embed code;
extract at least a portion of the text of the web page based, at least in part, on the embed code;
transmit a media object request and the extracted text to one or more remote server systems;
receive, from the one or more remote server systems, a response to the media object request including one or more media objects associated with the transmitted text; and
insert the one or more media objects into the web page;
wherein the response to the media object request is generated at the remote server systems by:
parsing the transmitted text to determine one or more keywords;
rating the relative importance of the determined keywords;
searching one or more databases that include one or more potential media objects;
accessing one or more ranking attributes of the one or more potential media objects;

combining the rating and ranking attributes to determine a priority of the potential media objects;

identifying the one or more media objects associated with the transmitted text based, at least in part, on the determined keywords, the priority of the potential media objects, and the search; and returning the one or more media objects to the client host in the response to the media object request; and storing enhancing code comprising computer-readable instructions operative, when executed, to cause the host processor to:

access an existing web page;

replicate, responsive to a user command, one or more sections of the embed code; and insert, responsive to the user command, the replicated embed code into the existing web page.

15. The method of claim 14 further comprising
obtaining the embed code from a remote server; and
optionally modifying the embed code to incorporate one or more user enhancement preferences.

16. The method of claim 15 wherein one user enhancement preference comprises a media object type preference.

17. The method of claim 14 wherein the user command identifies a selection of one or more portions of text of the existing web page; and wherein the method further comprises modifying the replicated embed code based on the selection of the one or more portions of the text of the existing web page.

18. The method of claim 17 further comprising extracting one or more keywords from the selection of the one or more portions of the text, and modifying the replicated embed code to include the one or more keywords.

* * * * *